March 24, 1970    L. U. C. KELLING ET AL    3,501,943
TRACING PROBE MECHANISM

Filed July 27, 1967    3 Sheets-Sheet 1

INVENTOR.
LEROY U. C. KELLING
JOHN M. RHOADES
BY RICHARD A. THOMAS

*Michael Masnik*

THEIR ATTORNEY

March 24, 1970   L. U. C. KELLING ETAL   3,501,943
TRACING PROBE MECHANISM

Filed July 27, 1967   3 Sheets-Sheet 2

INVENTOR.
LEROY U. C. KELLING
JOHN M. RHOADES
BY RICHARD A. THOMAS

Michael Masnik

THEIR ATTORNEY

United States Patent Office 3,501,943
Patented Mar. 24, 1970

3,501,943
TRACING PROBE MECHANISM
Leroy U. C. Kelling and John M. Rhoades, Waynesboro, and Richard A. Thomas, Staunton, Va., assignors to General Electric Company, a corporation of New York
Filed July 27, 1967, Ser. No. 656,449
Int. Cl. G01b 13/08
U.S. Cl. 73—37.5                                                      17 Claims

ABSTRACT OF THE DISCLOSURE

A tracer probe mechanism comprised of an apparatus for aiming the probe at any desired angle relative to the surface of the body to be traced with the probe tip remaining relatively fixed and a probe having an interchangeable elongated stylus member. The orienting apparatus is comprised of a support member with mechanical linkages for rotating the stylus member about the tip thereof and mechanical linkages for rotating the stylus member about the probe axis. A number of configurations of stylus members including those shaped to avoid interference with the body can be interchangeably connected to the probe unit.

BACKGROUND OF THE INVENTION

It is desirable in many industries to be able to trace the contour of an object so as to produce some physical indication of the contour of the object. A physical indication may consist of one or more drawings or charts of the dimensions of the object or may be a signal which controls the machine to make an object of the same or proportional contour. Such a tracing apparatus is particularly useful in the automobile industry where dimensions for tooling are frequently obtained by cutting a clay model into cross sections and dimensioning and taking the dimensions therefrom. However, in order to trace the contour of a model without destroying it, it is necessary to overcome two problems. First, in cases such as where a clay model is used, it is necessary to trace the contour without contacting the surface so as to prevent marring of the surface. This may be accomplished by means such as a pneumatic probe which uses the pressure of a gas emerging from a hollow probe close to the surface of the object to be traced to indicate the clearance between the probe and the object without marring the surface thereof. It is also possible to use capacitance, magnetic, photoelectric or very light mechanical contact type probe sensing means. A second problem, the one to which the subject invention is directed, is to provide an accurate presentation of the contour of the surface no matter how intricate it may be, and when necessary, maintaining the probe at a desired angular orientation relative to the surface to be traced.

SUMMARY OF THE INVENTION

Accordingly, it is an object of the present invention to provide an apparatus for allowing a probe to follow any intricacies in a surface of a body so that an accurate representation of the surface contour may be procured.

A further object is to provide apparatus for angularly orienting a probe stylus while maintaining the probe stylus tip relatively fixed.

A still further object is to provide such an apparatus which additionally includes means for avoiding interference between the probe and the body to be traced.

To fulfill the above stated objects, the subject invention provides an interchangeable stylus assembly, and an orienting apparatus connected thereto which is able to orient the stylus member to substantially any desired angle. The orienting apparatus includes means for causing rotation of the probe in two orthogonal planes. The axes of rotation of the probe intersect at a point substantially coincidental with the probe stylus tip so that the stylus is able to assume substantially any angular orientation while maintaining the probe tip substantially fixed. In order for the probe tip to be able to be inserted into any intricacy in the contour of the surface to be traced without interference with the body, a number of stylus members of varied configurations may be interchangeably connected to the probe without altering the relationship between the probe tip and the orienting apparatus.

The specification concludes with claims particularly pointing out and distinctly claiming the subject matter which I regard as my invention.

BRIEF DESCRIPTION OF THE DRAWINGS

Embodiments of my invention are described in detail in the following description taken in connection with the accompanying drawings in which.

DESCRIPTION OF THE PREFERRED EMBODIMENTS

Figure 1:
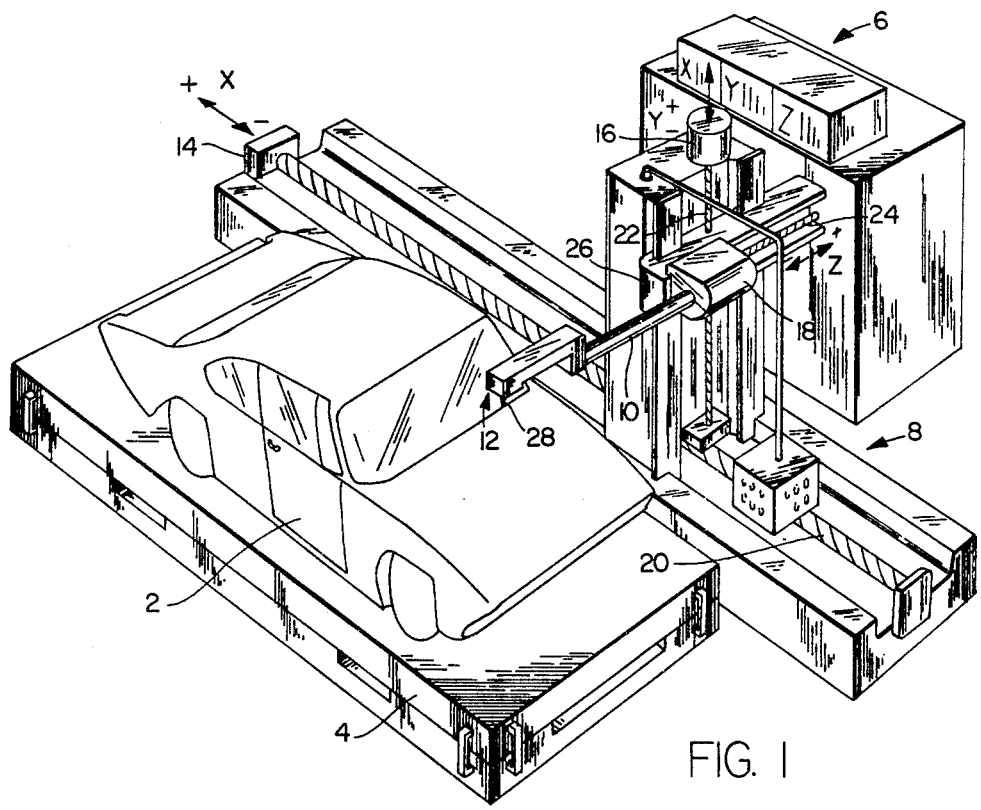
FIGURE 1 is a perspective view of a contour tracing apparatus.

In FIGURE 1 the operational portion of the contour tracing apparatus is shown. The object 2 such as a model, which is to be traced may be disposed on a stationary pallet 4 adjacent the contour tracing apparatus 6. The tracing portion of the apparatus 6 is basically comprised of a translation mechanism 8, an orientation mechanism 10, and a sensor probe 12. The translation mechanism includes three sets of motors 14, 16, 18, and screw-type translating means 20, 22, 24. Each set of motor and translating means respectively causes the probe 12 to translate in the X, Y and Z direction as indicated by the arrows shown in the drawing in FIGURE 1. The translation mechanism 8 provides movement of the probe 12 in all three directions relative to the object 2 and the orientation mechanism 10 provides angular movement of the longitudinal axis of the probe 12 to vary its angle of orientation without changing the position of the tip 28 of the probe 12 relative to the object 2.

The orientation mechanism 10 is rigidly attached to a portion of a probe support 26. The probe 12 itself is mounted on the orientation mechanism, as shown in FIGURE 2.

Figure 2:
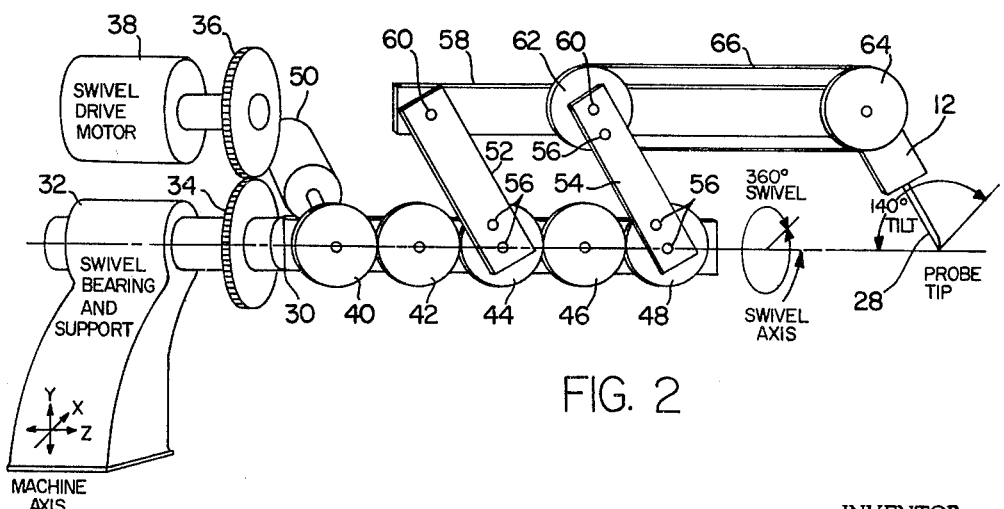
FIGURE 2 is a perspective view of one embodiment of the orientation mechanism of the contour tracing apparatus.

In FIGURE 2 a detailed view is shown of one embodiment of the orientation mechanism 10 which allows the angular orientation of the probe 12 to vary. The orientation mechanism 10 has means for effecting rotation of the probe 12 about the tip 28 of the probe in two orthogonal planes of rotation, the planes being referred to as swivel and tilt, so as to allow the probe to be oriented in substantially any angular direction. A horizontally extending support member 30 having a circular cross-section at one end thereof is mounted in a swivel bearing and support 32 so as to be cantilevered therefrom and rotatable therein. Concentrically mounted on the support member 30 is a drive gear 34. The gear 34 is engaged on one side by mating motor gear 36 which is driven by a swivel drive motor 38.

A plurality of five similar, intermeshing gears 40, 42, 44, 46, 48 are rotatably mounted on the support member 30 such that their axes of rotation are all parallel to one another and are perpendicular to the axis of the shaft member 30. One of the gears 40 is connected to a tilt drive motor 50 so as to be rotatably driven thereby. Each of the two similar, parallel longitudinal members 52, 54 are rigidly connected at one end to one of the gears 44, 48, respectively, so that they will rotate therewith. Connection may be effected by means such as a plurality of pins 56. The gears 42, 46 in this case, are used as idler gears. When the first gear 40 is rotated by the motor 50, the rotation will be transmitted to the two longitudinal members 52, 54 via the gears. The other ends of the longitudinal members 52, 54 are rotatably connected to a horizontal member 58 by means such as a single pin 60. A pulley 62 is rotatably mounted on one of the pins 60 and is also rigidly connected to one of the parallel longitudinal members 54 by means such as a pin 56 so that rotation of the gear 48 will be transmitted to the pulley 62. A similar pulley 64 is rotatably mounted to an end of the horizontal member 58, and an endless metal strap 66 is disposed about and primed to the two pulleys 62, 64 so that the rotation of pulley 62 will cause similar rotation of pulley 64. The probe 12 is rigidly attached to the pulley 64 so that the probe axis is parallel to that of the longitudinal members 52, 54 and the tip 28 of the probe is on the axis of rotation of the support member 30. Therefore, rotation of the tilt drive motor gear 40 will cause similar rotation of the probe 12.

Using the configuration shown in FIGURE 2, a full 360° swivel and 140° tilt of the probe 12 may be accomplished, thereby allowing the probe to approach the surface of the object at almost any desired angle.

Figure 3:
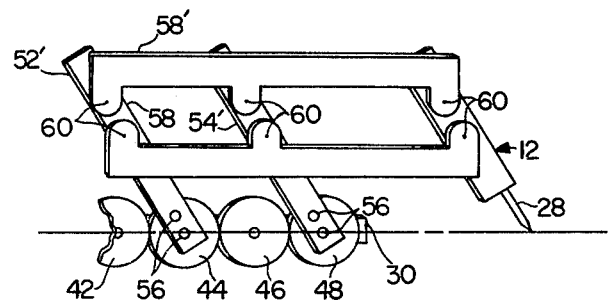
FIGURE 3 is a perspective view of a portion of a second embodiment of the orientation mechanism.

A second embodiment of the tilt mechanism is shown in FIGURE 3. The mechanism is somewhat similar to that shown in FIGURE 2 in that it has the same gear arrangement and similar, parallel longitudinal members 52', 54', which are respectively connected to gears 44 and 48. Horizontal member 58 is rotatably pinned to the longitudinal members 52', 54' approximately midway between the ends thereof. The second horizontal member 58' is pinned to the ends of the longitudinal members 52', 54' via pins 60. At the outer ends of horizontal members 58, 58' the probe 12, which may include an extension of its cover, is rotatably pinned via pins 60 to each horizontal member 58, 58' so that the axis of the probe is parallel to the axis of the longitudinal members 52', 54' and the probe tip 28 is along the axis of the support member 30.

Both embodiments of the orientation mechanism 10, as shown in FIGURES 2 and 3, allow a high degree of flexibility of orientation of the probe so that it may be positioned near to and substantially perpendicular to the surface of practically any contour no matter how abrupt or complex it may be. Such flexibility is an important feature of the contour tracing apparatus.

A more detailed description of the contour tracing apparatus is disclosed in copending application Ser. No. 656,453 which is assigned to the same assignee as the subject invention.

Figure 4:
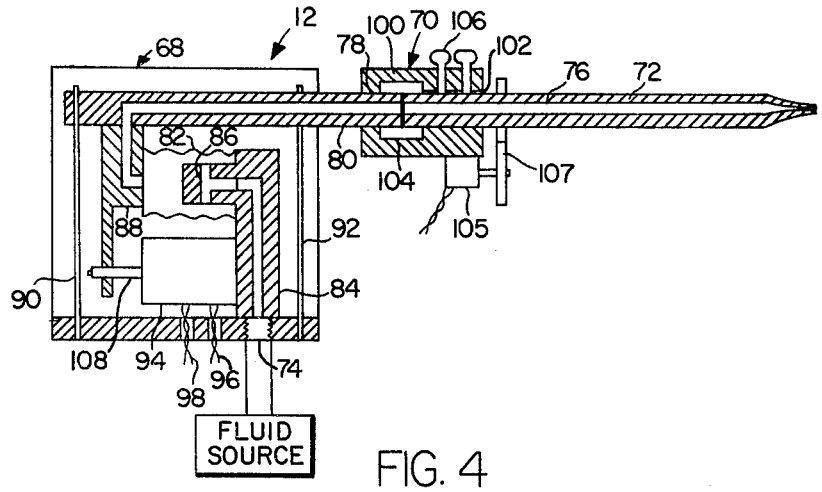
FIGURE 4 is a side view of a pneumatic probe.

In FIGURE 4 the probe 12 is shown. The probe is comprised of a probe body 68, a connecting portion 70 and a stylus member 72. Gas at a constant pressure is applied to the probe via an inlet 74. The gas passes through passageways in a pressure sensor mechanism within body 68 and is ducted via a passageway 78 in a hollow deflection rod 80 through the connecting portion to the passageway 76 within the stylus member. The gas pressure sensing mechanism is located within the body 68 of the probe and senses the gas pressure of the gas flowing through the stylus member 72 and provides an electrical signal indicative thereof. The gas pressure and hence the electrical signal is indicative of the clearance between the probe tip and the surface.

The contour tracing apparatus may also be used with other probe sensing means, such as those of the capacitance, magnetic, photoelectric or very light mechanical contact types. These types of sensing means may also be sensitive to the angle of orientation (angle of attack) of the probe axis relative to the surface to be traced.

A somewhat simplified representation of one pressure sensor mechanism which may be used is shown in FIGURE 4. Gas at a constant pressure enters the mechanism via an inlet 74 and is communicated to the interior of a bellows 82, via a passageway in a stationary support member 84 and a bellows fillter 86. One end of the bellows 82 is fixed to the stationary support member 84 and the other, movable end of the bellows 82 is attached to a bellows support member 88. The bellows support member 88 has a passageway therein which communicates the interior of the bellows to the passageway 78 and the deflecting rod 80. A plurality of leaf springs 90, 92 are attached to the deflecting rod 80 such that when the gas pressure changes within the deflecting rod 80 (when the probe tip comes close to the surface to be traced), the pressure within the bellows increases and the bellows expands. The expansion of the bellows 82 causes substantially linear translation of deflecting rod 80 as well as the attached bellows support member 88. A movable core 108 is attached to a lower portion of the bellows support member 88 so that movement of the support member 88 will cause a similar movement of the core 108. The core 108 moves within a transducer 94 such that a displacement of the core 108 will cause an electrical signal through output leads 96 indicative of the displacement. An electrical source is connected to the transducer via a pair of input leads 98. Thus, the output signal is indicative of the pressure within the deflecting rod 80 acting via the movement of the free end of the bellows 82 which causes the movement of the transducer core 108. This pressure sensor is disclosed in further detail in the copending application Ser. No. 656,453 which is mentioned above and is assigned to the same assignee as the subject invention.

The connecting portion 70 includes means to provide a fluid tight seal between the passageway 76 of the stylus 72 and the passageway 78 of the connecting portions 70 as well as a rigid support means to permit the stylus tip 78 to remain substantially fixed with respect to the connecting portion while also allowing rotation of the stylus member about the probe axis. One possible embodiment of a connecting portion is shown in cross section in FIGURE 4. The connecting portion 70 includes a substantially solid body 100 having a substantially cylindrical passageway 102 extending therethrough. A resilient connector piece 104 is disposed in a groove concentric with the passageway 102. The passageway 102 has a slightly larger diameter than the outer diameter of the stylus member 72, and the inner diameter of the resilient piece 104 is of slightly smaller diameter than the outer diameter of the stylus member 72. The deflection rod 80 connects the interior of the body of the probe 68 with the connector 70. A portion of the rod 80 has been inserted into the passageway 102 and through a portion of the resilient piece 104 and the rod 80 has been rigidly connected to the connector 70 by means such as welding. To connect the stylus member 72 to the probe body via the connecting portion, an end of the stylus is inserted through the passageway 102 and into the resilient piece 104 until it is in end abutting relationship with the rod 80. The resilient piece 104 provides a fluid tight seal between the passageway 78 of the rod 80 and the passageway 76 and the stylus member 72. A plurality of set screws 106 which extend through the body 80 of the connecting portion 70 may be used to rigidly hold the stylus member 72 against the body 80 of the connector.

The stylus member 72 may be rotated within the connecting portion 70 about the probe axis by loosening the set screws. Provision for such rotation is desirable when a stylus member having an offset portion is used so that the offset portion and the angle of inclination of the probe tip can be rotated to provide greater flexibility in positioning of the stylus member possibly to avoid interference with the body to be traced. A friction-type clutch may be provided between the portion of the connecting portion rigidly holding the stylus member and a portion connected to the pressure sensing mechanism so as to allow manual rotation of the stylus member. Alternatively, a small motor 105 may be mounted on the connecting portion with a gear mechanism 107 connecting the motor shaft to the stylus member. With such an arrangement, an operator can also control rotation of the stylus about the probe axis as desired.

Of course, many gas-tight and rigid means for connecting may be used without departing from the scope of the invention. Also, the pressure sensor used within the probe body may be of any known type.

FIGURES 5–10 show a variety of stylus member configurations which improve the flexibility of the probe by allowing the probe tip to follow substantially any contour of a surface while maintaining the gas flow from the probe tip substantially perpendicular to the surface. In referring to the drawings, the probe axis 108 which connects the center line of the stylus passageway at the connecting portion of the stylus 72 with the exit of the probe tip 28, is always the same no matter what is the configuration of the stylus member. Also, the length of the stylus member taken along the probe axis 108 is always the same no matter what is the configuration of the stylus member so that the probe tip will always remain substantially fixed whenever the stylus member is rotated by either the swivel or tilt motors, as explained in connection with FIGURE 2. All of the stylus members have a hollow passageway 76a–f throughout their length. It is not particularly necessary that all of the passageways are the same cross-sectional area, as this may be compensated for by an adjustment of the pressure sensor.

Figure 5:
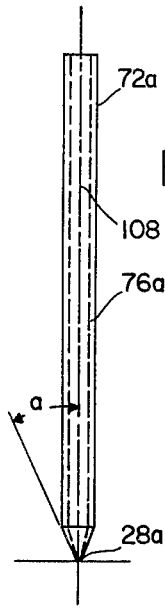
FIGURE 5 is a side view of a probe stylus member having a large angle convergent tip.

The stylus 72a shown in FIGURE 5 is a straight-type having a relatively blunt probe tip 28a. The probe tip 28a has a relatively large convergent angle $\theta_a$. Such a probe stylus is particularly useful for tracing gentle curves where there are no abrupt transitions. The blunt tip assures a relatively long tip life while making it relatively easy to manufacture the probe to very accurate tolerances regarding the dimensions of the fixed orifice of the probe tip 28a and the total length of the probe. Also the straight design makes it easier for the tracer operator to visually determine its angular orientation.

Figure 8:
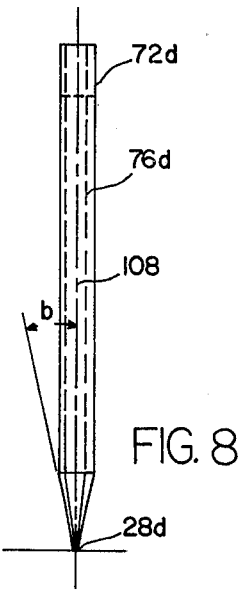
FIGURE 8 is a side view of a stylus member having a small angle convergent tip.
Figure 9:
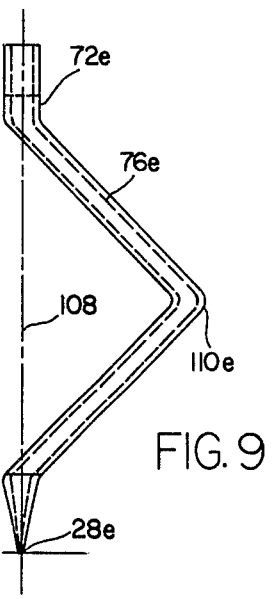
FIGURE 9 is a side view of a stylus member having a large offset portion and an axially extending tip.
Figure 10:
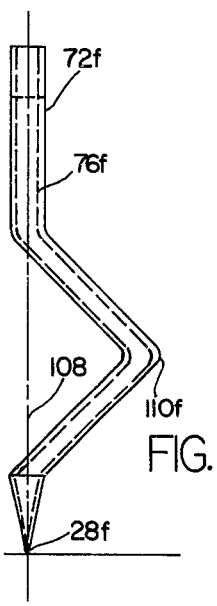
FIGURE 10 is a side view of a stylus member having a small offset portion and an axially extending tip.

In FIGURE 8 a somewhat similar stylus 72d is shown wherein the angle of convergence $\theta_b$ of its probe tip 28d is quite small so as to allow the probe to very accurately trace relatively small, abrupt changes in the contour of a surface. This stylus 72d might be used for general purposes and generally could be used anywhere the stylus 72a is useful. However, the sharper probe tip of the stylus 72d may be more difficult to manufacture than the stylus 72a.

Figure 6:
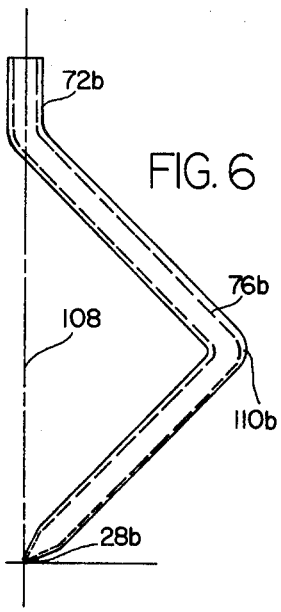
FIGURE 6 is a side view of a stylus member having a large offset portion and an aligned tip.
Figure 7:
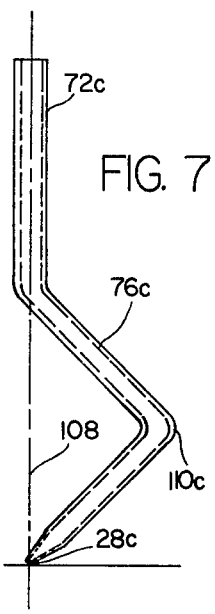
FIGURE 7 is a side view of a stylus member having a small offset portion and an aligned tip.

The stylii 72b, 72c shown in FIGURES 6 and 7 have offset portions 110b, 110c and aligned probe tips 28b, 28c. By aligned probe tip, it is meant that the gas exhausts from the probe tip in the same direction as the center line of the gas passageway 76b of the terminating portion of the offset stylus. Both stylii 72b, 72c are useful when there is a relatively large abrupt indentation or protrusion in the contour of the surface and the gas flow exiting from a stylus can most easily be maintained perpendicular to the surface to be traced when the probe tip is aligned. Stylus 72b, having a large offset portion 110b is preferred over stylus 72c, having a relatively small stylus portion, offset portion 110c, when the indentation and/or protrusions to be traced are quite large. As the orienting apparatus can only move the stylus member in a 140° tilt, the use of such of such an offset portion will allow the stylus to be maintained perpendicular to any surface if means is provided to rotate a stylus member about the probe axis 108, as explained above, so that an offset stylus can assume any tilt angle.

The stylus members 72e, 72f are similar to those stylus members 72b, 72c shown in FIGURES 6 and 7, the only difference being in the orientation of the probe tips 28e, 28f. The stylus members 72e, 72f have the probe tips in an axially extending direction, i.e., the exhausting gas is directed along the probe axis 108. Such stylus members 72e, 72f are useful primarily where there are major contour changes wherein the flow of exhausting gas can best be maintained perpendicular to the surface when the exhausting gas flow is in the same direction as the probe axis.

Of course, it is obvious that the stylus members of substantially any configuration may be used as long as the given stylus length (measured along the probe axis) is maintained, and the gas exit of the probe tip is along the probe axis. For example, an offset portion having an angle substantially different from the 45° angle of those shown in FIGURES 6, 7, 9 and 10 can be used or a C-shaped offset configuration can be used. Also, an irregularly shaped offset portion can be used if desirable.

Thus, the subject invention shows a probe tracing apparatus providing substantially complete flexibility as to angular orientation of the probe which is accomplished by a relatively simple and easily operable mechanism. Thus, in the case of a pneumatic probe, the probe can be oriented so that the gas exhausting from the probe tip can be maintained substantially perpendicular to a surface and at a desired clearance from the surface no matter how intricate the contour of the surface may be so that the surface can be accurately traced.

What we claim as new and desire to secure by Letters Patent of the United States is:

1. A tracing probe apparatus comprising:
   (a) an elongated stylus member including at one end a probe sensing tip;
   (b) a probe body including connection means for connecting said probe body to said stylus member;
   (c) a probe orienting mechanism comprising a support member, first means mounted on said support member for rotating said probe body about a first axis, and second means mounted on said support member for rotating said probe body about a second axis perpendicular to and intersecting said first axis, said stylus member being dimensioned to have said probe sensing tip effectively coincide with the intersection of the first and second axes so that said probe tip remains substantially fixed in space relative to said support member of said orienting mechanism.

2. A probe apparatus as in claim 1 wherein said probe body further includes sensing means connected to said sensing tip for providing a signal indicative of the distance between said probe sensing tip and a surface to be traced.

3. A probe apparatus as in cliam 2 wherein said stylus member has an offset portion outside the axis of said stylus member.

4. A tracing probe apparatus comprising:
   (a) an elongated stylus member having at one end a probe tip and at the other end a connecting part, and having a passageway throughout the length thereof;
   (b) a fluid source;
   (c) a probe body having a fluid inlet connected to said fluid source, and a fluid outlet connected to said fluid inlet, means for sensing the pressure of the fluid exiting through said fluid outlet, and fluid connection means for providing a fluid connection between said fluid outlet and said connecting part of said stylus member;

(d) said stylus member being dimensioned to have said probe sensing tip essentially coincide with the intersection of perpendicular first and second axes, (e) a probe orienting mechanism comprising a support member, first means mounted on said support member for rotating said probe body about said first axis, second means mounted on said support member for rotating said probe body about said second axis.

5. A probe apparatus as in claim 4 wherein said fluid connection means includes a support portion to substantially fix said stylus member with respect to said fluid outlet; and said stylus member is dimensioned so that said probe tip substantially coincides with the intersection of the first and second axes so that said probe tip remains substantially fixed relative to said support member of said orienting mechanism.

6. A probe apparatus as in claim 5 wherein said support portion of said fluid connection means includes means for allowing rotation of said stylus member about the axis of said stylus member.

7. A probe apparatus as in claim 6 wherein said means for allowing rotation includes a motor means drivably connected to said stylus member so that actuation of said motor means causes rotation of said stylus member.

8. A probe apparatus as in claim 4 wherein said stylus member has an offset portion outside the axis of said stylus member.

9. A probe apparatus as in claim 8 wherein the portion of said passageway that passes through said probe tip of said stylus member is along the probe axis.

10. A probe apparatus as in claim 8 wherein the portion of said passageway that passes through said probe tip is aligned with the terminating portion of said passageway through said stylus member.

11. A tracing probe apparatus comprising:
(a) an elongated stylus member including at one end a probe sensing tip;
(b) a support member;
(c) means mounted on said support member for rotating said stylus member about a first axis and means mounted on said support member for rotating said stylus member about a second axis perpendicular to and intersecting said first axis;
(d) said stylus member being dimensioned to have said sensing tip substantially coincide with the intersection of said first and second axes so that said tip remains substantially fixed relative to said support member at all angles of orienting of said stylus member.

12. An arrangement for probing the surface contour of a shaped body comprising a probe elongated along one axis and terminating in a probe tip,
(a) means for orienting the angular position of the axis of said probe with respect to said surface comprising:
(b) means for controlling the angle of rotation of said probe about a first axis passing through said probe tip,
(c) and means for controlling the angle of rotation of said probe axis about a second axis perpendicular to and intersecting said first axis while maintaining the probe tip essentially at said intersection.

13. An arrangement according to claim 12 further comprising means for controlling the lineal position of said probe tip with respect to a reference point remote from at least one of the axes of rotation of said probe.

14. An arrangement for probing the surface contour of a shaped body comprising a probe elongated along one axis and terminating in a probe tip located on said one axis,
(a) means for orienting the angular position of the axis of said probe with respect to said surface comprising;
(b) means for controlling the angle of rotation of said probe about a first axis passing through said probe tip;
(c) means for controlling the angle of rotation of said probe axis about a second axis perpendicular to and intersecting said first axis while maintaining the probe tip at said intersection;
(d) a portion of the body of said probe being shaped to lie outside said probe axis to pass around surface protrusions of said shaped body which would intersect a portion of said probe axis.

15. An arrangement according to claim 14 comprising means for controlling the lineal position of said probe with respect to a three coordinate reference point remote from the planes of rotation of probe.

16. A tracing probe apparatus comprising:
(a) an elongated stylus member including in one end a probe sensing tip;
(b) a tilt axis perpendicular to and intersecting a swivel axis at a point,
(c) means for supporting said stylus member such that its axis is always perpendicular to said tilt axis and said sensing tip essentially coincides with the intersection point of said swivel and tilt axes;
(d) means for rotating said stylus member and tilt axis simultaneously about said swivel axis to provide one degree of freedom,
(e) means for rotating said stylus member axis about said tilt axis while maintaining its perpendicularity with respect to the tilt axis for a second degree of freedom.

17. An arrangement according to claim 16 further comprising means independent of said aforementioned rotating means for controlling the positioning of said sensing tip and said swivel and tilt axes in space.

References Cited
UNITED STATES PATENTS

| | | | |
|---|---|---|---|
| 3,377,713 | 4/1968 | Schiler | 33—174 |
| 3,364,728 | 1/1968 | Albertson et al. | 73—37.5 |
| 3,192,628 | 7/1965 | Wroble et al. | 33—23 |
| 2,992,375 | 7/1961 | Mustonen et al. | 318—31 |

SAMUEL S. MATTHEWS, Primary Examiner

U.S. Cl. X.R.

33—174